United States Patent
Chu (10) Patent No.: US 11,122,306 B2
(45) Date of Patent: Sep. 14, 2021

(54) SYNCHRONOUS PLAYBACK SYSTEM AND SYNCHRONOUS PLAYBACK METHOD

(71) Applicant: Wistron Corporation, New Taipei (TW)

(72) Inventor: Yen-Yin Chu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/247,591

(22) Filed: Jan. 15, 2019

(65) Prior Publication Data

US 2020/0145704 A1 May 7, 2020

(30) Foreign Application Priority Data

Nov. 2, 2018 (TW) ................. 107139070

(51) Int. Cl.
*H04N 21/236* (2011.01)
*H04N 21/43* (2011.01)
*H04J 3/06* (2006.01)

(52) U.S. Cl.
CPC .......... *H04N 21/23611* (2013.01); *H04J 3/06* (2013.01); *H04N 21/4305* (2013.01)

(58) Field of Classification Search
CPC .. H04N 21/23611; H04N 21/4305; H04J 3/06
See application file for complete search history.

(56) References Cited

U.S. PATENT DOCUMENTS

2012/0117180 A1* 5/2012 Ranasinghe .......... H04J 3/0667
709/208

2014/0359075 A1* 12/2014 Amidei .............. H04N 21/4305
709/219
2015/0120953 A1* 4/2015 Crowe .................... H04L 65/80
709/231

FOREIGN PATENT DOCUMENTS

| CN | 104284098 | | 1/2015 |
| CN | 108366283 | | 8/2018 |
| CN | 108366283 A | * | 8/2018 |

OTHER PUBLICATIONS

"Office Action of Taiwan Counterpart Application", dated Sep. 17, 2019, pp. 1-6.
"Office Action of China Counterpart Application", dated Jul. 22, 2021, p. 1-p. 13.

* cited by examiner

*Primary Examiner* — Masum Billah
*Assistant Examiner* — Hesham K Abouzahra
(74) *Attorney, Agent, or Firm* — JCIPRNET (57) ABSTRACT

A synchronous playback method adapted for enabling a plurality of playback devices to synchronously play media content stored by the playback devices. The method includes performing a time-calibrating operation on a time server by each of the playback devices to obtain a target time error value of each of the playback devices; issuing a plurality of playback commands to the playback devices through a control server; calculating adjusted target time of each of the playback devices according to target time of the received playback command and the target time error value of each of the playback devices through each of the playback devices; and playing a plurality of pieces of target media content corresponding to the playback commands according to the adjusted target time of the respective playback devices through the playback devices.

8 Claims, 4 Drawing Sheets

SYNCHRONOUS PLAYBACK SYSTEM AND SYNCHRONOUS PLAYBACK METHOD

CROSS-REFERENCE TO RELATED APPLICATION

This application claims the priority benefit of Taiwan application serial no. 107139070, filed on Nov. 2, 2018. The entirety of the above-mentioned patent application is hereby incorporated by reference herein and made a part of this specification.

BACKGROUND

Technical Field

The disclosure relates to a playback system. More particularly, the disclosure relates to a synchronous playback system and a synchronous playback method.

Description of Related Art

Movies or advertisements nowadays are played by adopting large screens most of the time, so as to provide viewers a better viewing experience. In a conventional manner, multiple playback devices are used to individually play multiple sub-screens configured to form the above-mentioned large screen. The sub-screens share the screens through hardware. That is, the input terminals of all of the playback devices are connected to a server through physical wires, and the server projects multiple pieces of media content corresponding to the multiple sub-screens to the corresponding playback devices. In the above conventional manner, physical wires are required to be set up, and higher costs are thereby generated. Further, when the physical wires are set up, problems such as space limitation may also occur.

In another conventional manner; however, the multiple pieces of media content individually corresponding to the sub-screens are stored in the playback devices first through network transmission, and the playback devices are then notified to synchronously play the multiple pieces of media content at a specific time. Nevertheless, the device time of the playback devices is not synchronous, and delays may also be generated owing to different levels of network connection quality during data transmission. In this way, even the pieces of media content are played at the same specific time, the pieces of media content played by the playback devices still cannot be synchronously played. For instance, in a current high resolution (60 fps) movie, as long as the playback time error reaches 100 milliseconds, a delay error of 1 to 2 frames is to be caused. As such, the pieces of content displayed by the sub-screens of the large screen are not synchronously displayed, the images displayed at the same time by the sub-screens cannot correspond to the same image of the large screen, and that leads to a poor viewing experience.

Therefore, how to enable multiple playback devices to synchronously play the media content is an important issue.

SUMMARY

The disclosure provides a synchronous playback system and a synchronous playback method capable of enabling a plurality of playback devices in the synchronous playback system to synchronously start playing respective target media content.

An embodiment of the disclosure provides a synchronous playback system. The system includes M playback devices, a control server, and a time server. Each of the M playback devices stores one piece or a plurality of pieces of media content, where M is a positive integer. The control server is connected to the M playback devices through network connection. The time server is configured to obtain standard time information through the Network Time Protocol and provides the standard time information to the M playback devices through the Internet. In addition, each of the M playback devices performs a time-calibrating operation on the time server to obtain a target time error value of each of the M playback devices. The control server issues M playback commands to the M playback devices. The M playback commands are configured to instruct the M playback devices to individually play M pieces of target media content individually stored in the M playback devices at a same target time. The M playback devices calculate adjusted target time of each of the M playback devices according to the target time and the target time error value of each of the M playback devices and play the M pieces of target media content according to the respective adjusted target time of the M playback devices.

An embodiment of the disclosure further provides a synchronous playback method adapted to enable M playback devices to synchronously play respective stored media content, where M is a positive integer. The method includes the following steps. A time-calibrating operation is performed on a time server by each of the M playback devices to obtain a target time error value of each of the M playback devices. M playback commands are issued to the M playback devices through a control server. The M playback commands are configured to instruct the M playback devices to individually play M pieces of target media content individually stored in the M playback devices at a same target time. The M playback devices calculate adjusted target time of each of the M playback devices according to the target time and the target time error value of each of the M playback devices. The M pieces of target media content are played according to the respective adjusted target time of the M playback devices through the M playback devices.

To sum up, in the synchronous playback system and the synchronous playback method provided by the embodiments of the disclosure, multiple playback devices may be used to perform the time-calibrating operation on the time server so as to obtain the target time error values respectively corresponding to the playback devices. The target time corresponding to the playback commands issued by the control server may be adjusted according to the target time error values, so that the playback devices may synchronously play the plural pieces of target media content instructed by the playback commands according to the adjusted target time. In this way, delays among the pieces of target media content played by the playback devices may be reduced, and the synchronous playback system may therefore provide a favorable playback effect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
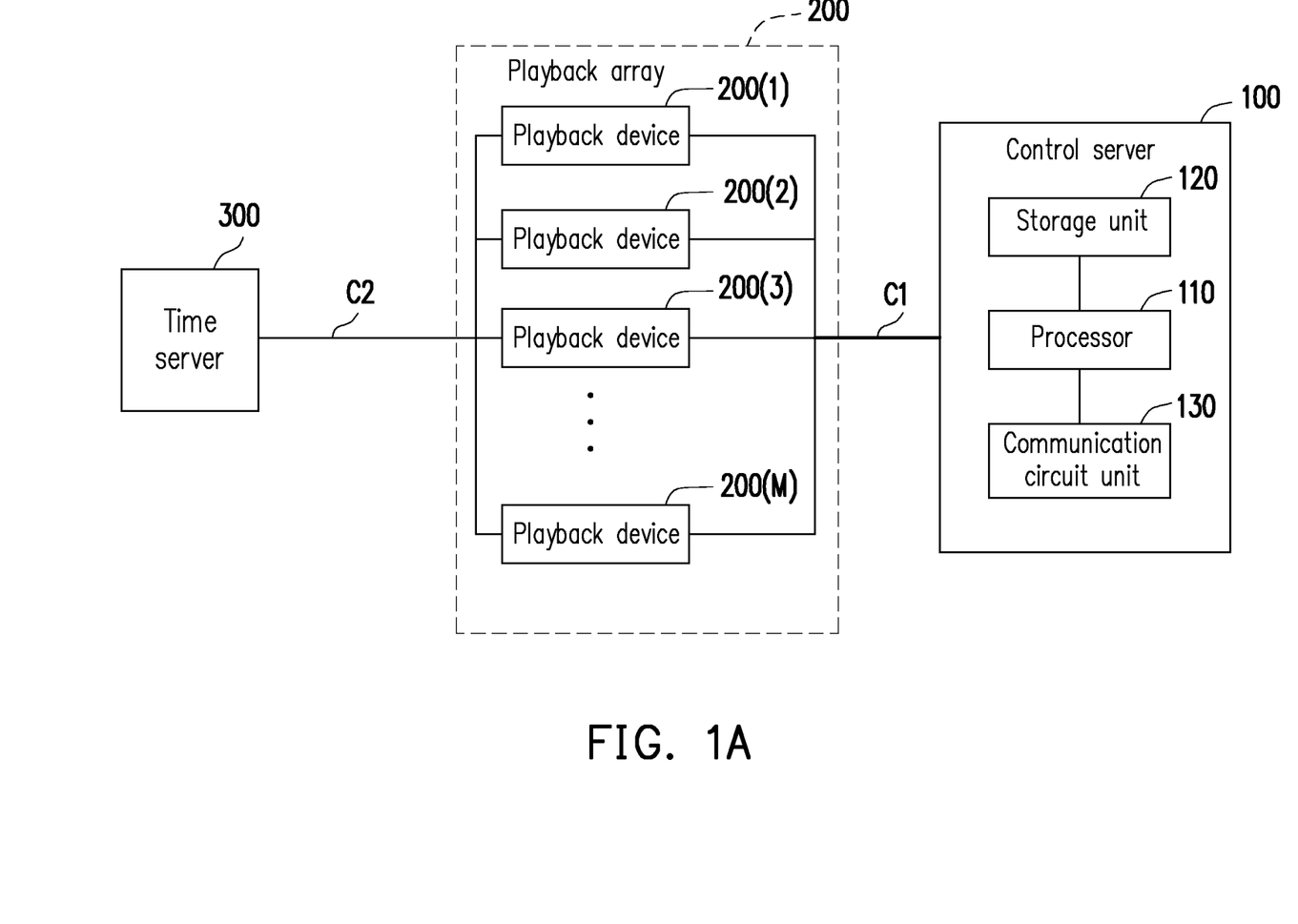
FIG. 1A is a schematic block diagram illustrating a synchronous playback system according to an embodiment of the disclosure.

FIG. 1A is a schematic block view illustrating a synchronous playback system according to an embodiment of the disclosure. With reference to FIG. 1A, in this embodiment, a synchronous playback system includes a control server 100, a plurality of playback devices 200(1) to 200(M), and a time server 300. The control server 100 may issue a plurality of playback commands to instruct the playback devices 200(1) to 200(M) to synchronously play specific pieces of media content respectively stored in the playback devices 200(1) to 200(M) at a specific time. Implementation is provided in detail through drawings and embodiments provided as follows.

In this embodiment, the playback devices 200(1) to 200(M) may form a playback array 200 configured to jointly play one piece of main media content through individually playing the stored pieces of media content through the playback devices 200(1) to 200(M). The pieces of media content constitute the entire main media content. Each piece of media content includes voice data, image data, or a combination of the foregoing. That is, the playback array 200 may play an image and/or a voice of the main media content.

For instance, if it is assumed that the main media content is an image of a main screen, and M is 2 (i.e., the playback array 200 is formed by two playback devices 200(1) and 200(2)), in this example, first media content corresponding to a left half image of the main screen may be played through the playback device 200(1), and second media content corresponding to a right half image of the main screen may be played through the playback device 200(2). In this way, when the playback devices 200(1) and 200(2) synchronously begin playing the first media content and the second media content, the left half image and the right half image respectively displayed by the playback devices 200(1) and 200(2) combined constitute the image of the main screen.

The control server 100 is connected to the playback devices 200(1) to 200(M) through network connection C1. The disclosure is not intended to limit how the network connection is to be implemented through wired connection or wireless connection, but wireless connection is preferred. The control server 100 includes a processor 110, a storage unit 120, and a communication circuit unit 130. The storage unit 120 and the communication circuit unit 130 are coupled to the processor 110. Operation of each hardware component of the control server 100 may be treated as operation of the control server 100.

The playback devices 200(1) to 200(M) may be connected to the time server 300 through network connection C2.

The time server 300 is, for example, a computer network instrument that obtains standard time information from a reference clock (e.g., an atomic clock, a GPS clock, other radio clock, or other similar clocks) according to a time-calibrating request received from any other electronic device and transmits the standard time information to the electronic device (e.g., the playback device) through network connection. In this embodiment, the time server 300 uses the Network Time Protocol (NTP). The standard time information obtained by the time server 300 may be provided by another clock server, connected atomic clock, or radio clock. Other details related to the time server 300 or the Network Time Protocol is not the main technical features of the disclosure, and further description is not provided herein. In one embodiment, the time server 300 may be incorporated into the control server 100.

The processor 110 is a piece of hardware equipped with computing capability and is configured to manage overall operation of the control server 100. The processor 110 may also be used to control overall operation of the synchronous playback system. In this embodiment, the processor 110 is, for example, a single-core or multi-core central processing unit (CPU), a micro-processor, or other programmable processors, a digital signal processor (DSP), a programmable controller, an application specific integrated circuit (ASIC), a programmable logic device (PLD), or other similar devices.

The storage unit 120 is configured to temporarily store data as instructed by the processor 110, and the data includes data used to manage the control server 100, data accessed from an external electronic device (e.g., a personal computer, a notebook computer, a server, or other host systems). The disclosure is not limited thereto. In addition, the storage unit 120 may further record data that needs to be stored for a long period of time as instructed by the processor 110, for example, one or a plurality of main media content, a plurality of media content corresponding to each of the one or the plurality of main media content, and firmware or software used to manage the control server 100. Note that the storage unit 120 may be a non-volatile memory storage device of any form (e.g., a hard disk drive or a solid state disk).

The communication circuit unit 130 is coupled to the processor 110 and is configured to transmit or receive data (e.g., the media content or the commands) through wireless communication. In this embodiment, the communication circuit unit 130 may include a wireless communication module (not shown) and supports one of the wireless fidelity (WiFi) system and bluetooth communication technology or a combination of the foregoing and is not limited in this regard. In addition, the communication circuit unit 130 may also include a wired communication module (not shown) and may transmit or receive data through wired communication. In this embodiment, the processor 110 is configured to send M playback commands to the playback devices 200(1) to 200(M) through the communication circuit unit 130, so as to instruct the playback devices 200(1) to 200(M) to synchronously play target media content stored by the respective playback devices 200(1) to 200(M) at a specific time.

Figure 1B:
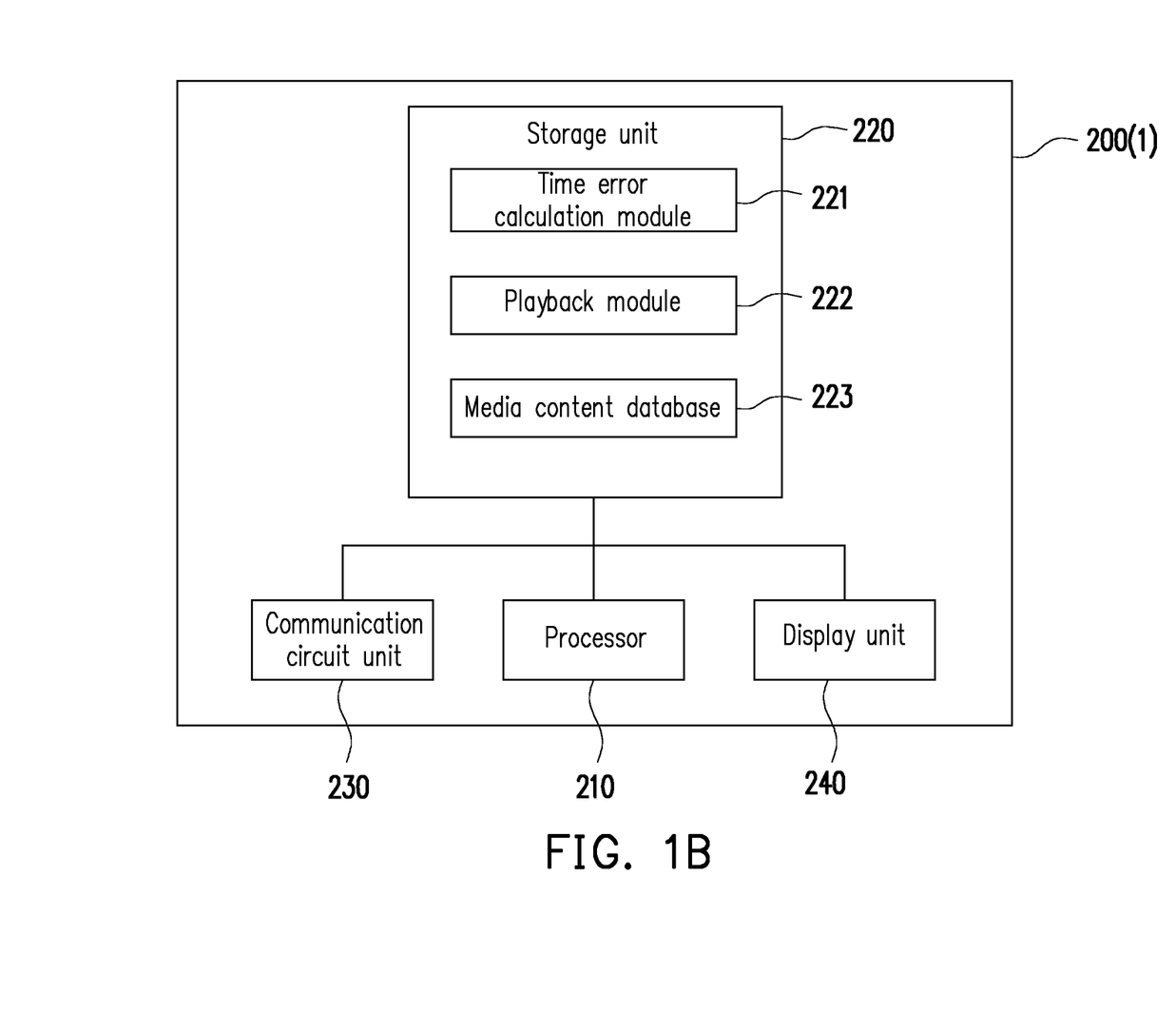
FIG. 1B is schematic block diagram illustrating a playback device according to an embodiment of the disclosure.

Each hardware component of one of the playback devices is described in FIG. 1B.

FIG. 1B is schematic block view illustrating a playback device according to an embodiment of the disclosure. With reference to FIG. 1B, in this embodiment, the playback device 200(1) includes a processor 210, a storage unit 220, a communication circuit unit 230, and a display unit 240. The storage unit 220, the communication circuit unit 230, and the display unit 240 are coupled to the processor 210.

Note that in this embodiment, for ease of description, the media content includes only image data corresponding to a screen, and the image data is outputted through the display unit 240 to display the image of the screen. Nevertheless, the disclosure is not limited thereto. For instance, in another embodiment, the media content further includes audio data corresponding to the screen, and the playback device 200(1) may further include an audio output device (e.g., a speaker) to output a voice of the screen. That is, in the another embodiment, when the playback device 200(1) plays the media content, the playback device 200(1) may display the corresponding image through the display unit 240 and outputs the corresponding voice through the audio output device.

Similar to the processor 110, the processor 210 is a piece of hardware equipped with computing capability and is configured to manage overall operation of the playback device 200(1). The processor 210 is configured to play the corresponding media content according to the playback command received from the control server 100. In this embodiment, the processor 210 may be further configured to perform the time-calibrating operation, so as to receive the standard time information from the time server 300 and to calibrate device time of the playback device 200(1) according to the standard time information. That is, the current device time of the playback device 200(1) is adjusted to standard time corresponding to the standard time information.

Similar to the storage unit 120, the storage unit 220 is configured to temporarily store data as instructed by the processor 210, and the data includes data configured to manage the playback device 200(1), data accessed from an external electronic device (e.g., the control server 100, the time server 300, or other host systems). The disclosure is not limited thereto. In addition, the storage unit 220 may further record data that needs to be stored for a long period of time as instructed by the processor 210, for example, a plurality of program code modules 221 to 222 and a media content database 223. The media content database 223 is configured to store one piece or a plurality of media content. Further, the one or the plurality of media content may be pre-downloaded to the media content database 223 through network connection from a data source (e.g., the control server 100 or other electronic devices) or may be downloaded to the media content database 223 from other storage devices through a connection interface circuit. In this embodiment, the processor 210 may access and execute the program code modules 221 to 222 to implement the synchronous playback method provided by this embodiment and related operation.

The plurality of program code modules include a time error calculation module 221 and a playback module 222. The time error calculation module 221 is configured to calculate a time error value (e.g., a first time error value, a second time error value, and a target time error value) corresponding to the playback device 200(1). The playback module 222 is configured to instruct the display unit 240 to start playing the target media content according to the target time error value and the target time instructed by the playback command.

Note that firmware or software configured to manage the playback device 200(1) may also be stored in the storage unit 220. Note that the storage unit 220 may be a non-volatile memory storage device of any form (e.g., a hard disk drive or a solid state disk).

The communication circuit unit 230 is coupled to the processor 210 and is configured to transmit or receive data (e.g., the media content or the commands) through wireless communication. In this embodiment, the communication circuit unit 230 may include a wireless communication module (not shown) and supports one of the wireless fidelity (WiFi) system and bluetooth communication technology or a combination of the foregoing and is not limited in this regard. In addition, the communication circuit unit 230 may also include a wired communication module (not shown) and may transmit or receive data through wired communication. In this embodiment, the communication circuit unit 230 may establish network connection with the communication circuit unit 130 (e.g., through the Internet or a local area network) to transmit commands or data.

The display unit 240 is coupled to the processor 210 and is configured to display a desktop of an operating system of the playback device 200(1) or content played by the playback device 200(1). For instance, the display unit 240 may be a liquid crystal display (LCD), a light-emitting diode (LED) display, a field emission display (FED), but the disclosure is not limited thereto. For instance, in another embodiment, the display unit 240 may also include a projection device.

Figure 2A:
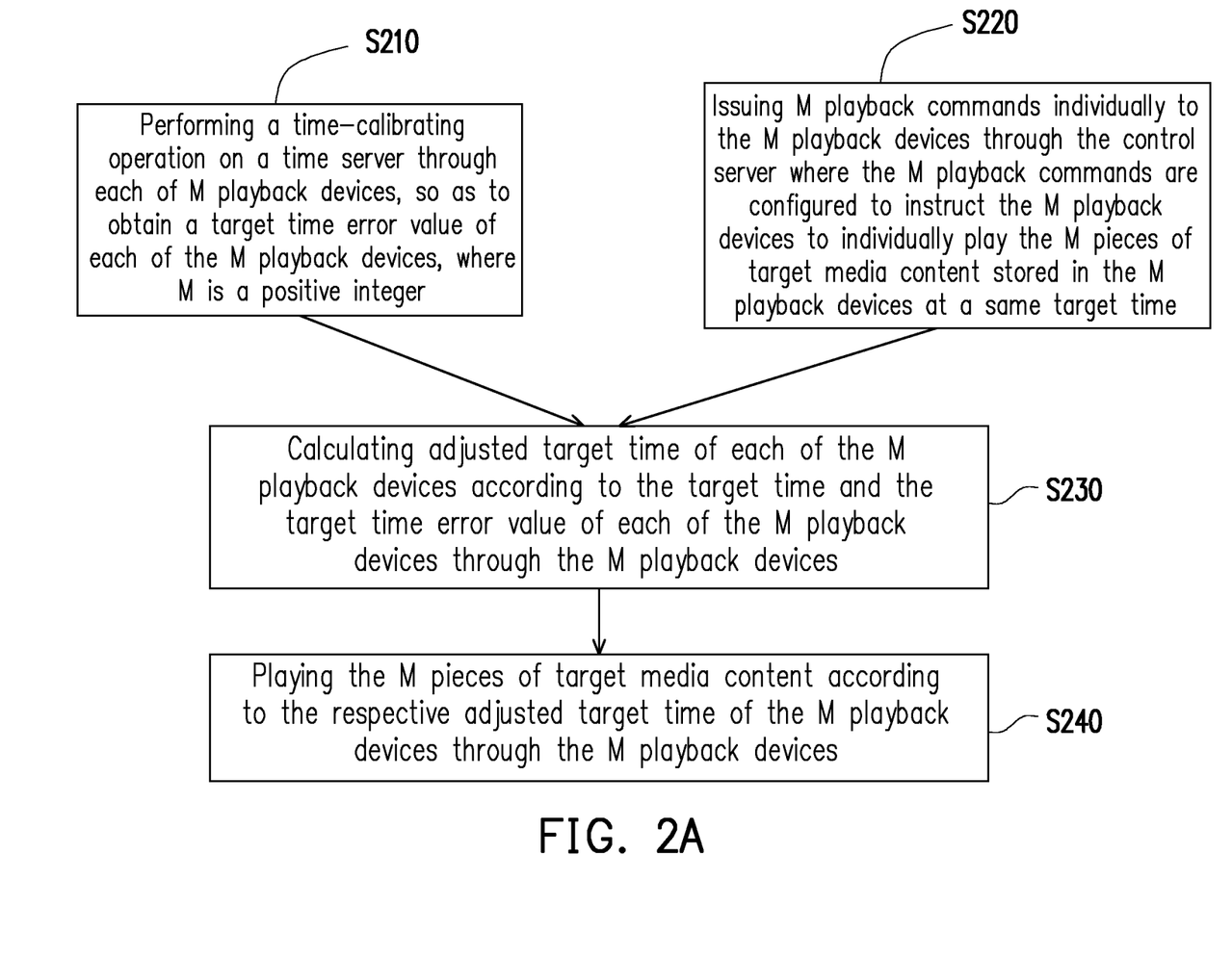
FIG. 2A is a flow chart illustrating a synchronous playback method according to an embodiment of the disclosure.

Details of the synchronous playback system and the synchronous playback method provided by this embodiment are described through FIG. 2A.

FIG. 2A is a flow chart illustrating a synchronous playback method according to an embodiment of the disclosure. With reference to FIG. 2A, in step S210, a time-calibrating operation is performed on the time server through each of the M playback devices 200(1) to 200(M), so as to obtain a target time error value of each of the M playback devices 200(1) to 200(M), where M is a positive integer.

To be specific, each of the playback devices may perform the time-calibrating operation of its own at a specific timing, and each of the playback devices may obtain (calculate) the target time error value of its own after the time-calibrating operation is completed. Related details are described through FIG. 2B first.

Figure 2B:
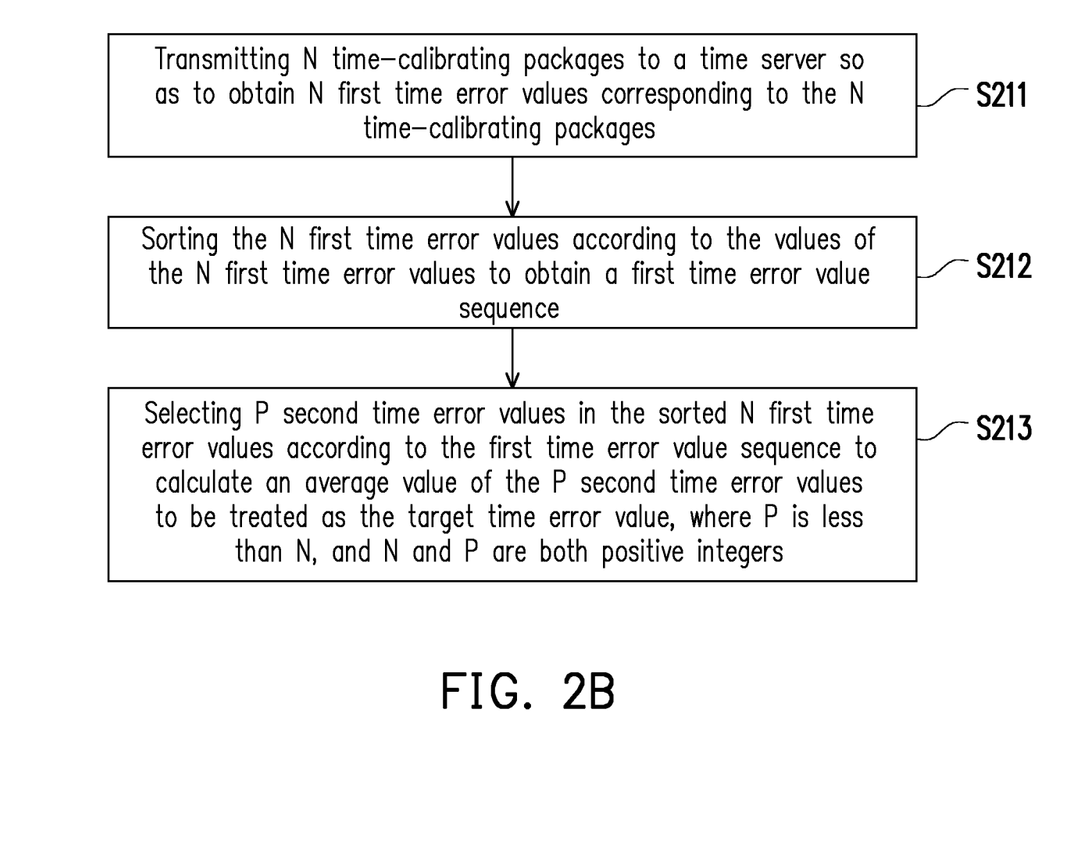
FIG. 2B is a flow chart illustrating calculation of a target time error value according to an embodiment of the disclosure.

FIG. 2B is a flow chart illustrating calculation of a target time error value according to an embodiment of the disclosure. The playback device 200(1) is taken as an example only in the following, so as to describe details of calculating the target time error value corresponding to the playback device 200(1) by the playback device 200(1). With reference to FIG. 2B, in step S211, the processor 210 (or the time error calculation module 221) transmits N time-calibrating packages to the time server 300 through the communication circuit unit 230, so as to obtain N first time error values corresponding to the N time-calibrating packages.

For instance, the time error calculation module 221 may establish a connection with the time server 300 at a specific timing through the User Datagram Protocol (UDP) and sends the N time-calibrating packages to the time server 300, where N is a positive integer. Each of the time-calibrating packages may include a time calibration request. The time calibration request is configured to instruct the time server 300 to provide a response of the standard time information to the time error calculation module 221. The specific timing includes but is not limited to: (1) the playback device 200(1) is in idle; (2) the playback device 200(1) is awakened; (3) the playback device 200(1) receives a playback command; (4) a periodic specific time point.

Specifically, the first time error value corresponding to one of the N time-calibrating packages transmitted by the playback device 200(1) is calculated by the processor 210 (or the time error calculation module 221) according to the following formula (I):

$$\theta = \frac{(t_1 - t_0) + (t_2 - t_3)}{2} \quad (I)$$

Herein, $\theta$ is the calculated first time error value, $t_0$ is time of transmitting the time-calibrating package from the playback device 200(1), $t_1$ is time of receiving the time-calibrating package by the time server 300, $t_2$ is time of transmitting a response corresponding to the time-calibrating package by the time server 300, and $t_3$ is time of receiving the response by the playback device 200(1). Herein, the response is configured to indicate the time server 300 has received the time-calibrating package, and the response includes the standard time information. Herein, the playback device 200(1) adjusts the device time of the playback device 200(1) to the standard time according to the standard time information. In other words, the calculated first time error value may reflect average network delay time of the network connection of the playback device 200(1) and the time server 300. By analogy, the playback device 200(1) may calculate the N first time error values corresponding to the N time-calibrating packages. Note that in this embodiment, during the execution of time-calibrating operation, the playback device 200(1) may calibrate the device time as the standard time.

Next, in step S212, the processor 210 (or the time error calculation module 221) sorts the N first time error values according to the values of the N first time error values to obtain a first time error value sequence. For instance, the N first time error values in the first time error value sequence may be sorted from a greatest to a least values or from the least to the greatest values, and the disclosure is not limited thereto. That is, after sorting is completed, the first time error value sequence includes N sorted first time error values.

Next, in step S213, the processor 210 (or the time error calculation module 221) selects P second time error values in the sorted N first time error values according to the first time error value sequence to calculate an average value of the P second time error values to be treated as the target time error value. Herein, P is less than N, and N and P are both positive integers.

To be specific, a total number of one or plural sorted first time error values sorted prior to the P second time error values in the first time error value sequence is a, and a total number of one or plural sorted first time error values sorted after the P second time error values in the first time error value sequence is b. Herein, (a+b)=(N−P), and a and b are positive integers. Note that in an embodiment, one of a or b may be 0.

That is, the processor 210 (or the time error calculation module 221) ignores the one or plural sorted first time error values sorted at the front of the first time error value sequence (the total number is a) or/and ignores the one or plural sorted first time error values sorted in the back of the first time error value sequence (the total number is b) and selects the P sorted first time error values at a middle section to be treated as the second time error values. Next, the processor 210 (or the time error calculation module 221) calculates an average value of the P second time error values and treats the calculated average value as the target time error value.

In other words, in this embodiment, an extreme time error value can be removed through the foregoing manner, and a less extreme time error value at the middle section (the P sorted first time error values) is selected to calculate the less distorted target time error value.

With reference to FIG. 2A again, in step S220, the M playback commands are individually issued to the M playback devices 200(1) to 200(M) through the control server 100. The M playback commands are configured to instruct the M playback devices 200(1) to 200(M) to individually play the M pieces of target media content stored in the M playback devices 200(1) to 200(M) at a same target time.

For instance, when the processor 110 tries to play one piece of target main media content through the playback array 200, the target main media content is divided into a plurality of pieces of target media content and the pieces are individually stored in the M playback devices 200(1) to 200(M). In order to enable the M playback devices 200(1) to 200(M) to synchronously play the individually-stored target media content, the time when the processor 110 notifies the M playback devices 200(1) to 200(M) to start playing the individually-stored target media content through issuing the M playback commands is target time. In this way, the overall target main media content is presented as the M playback devices 200(1) to 200(M) synchronously start playing the M pieces of target media content at the target time.

Next, in step S230, adjusted target time of each of the M playback devices is calculated according to the target time and the target time error value of each of the M playback devices through the M playback devices.

For instance, one playback device of the M playback devices (e.g., the playback device 200(1)) is taken as an example herein. The processor 210 (or the time error calculation module 221) of the playback device 0200(1) subtracts the calculated target time error value of the playback device 200(1) from the target time to obtain a difference value and treats the difference value as the adjusted target time. For instance, the target time is 12:00:00 (hour:minute:second), and the target time error value is 2 seconds. The calculated adjusted target time is 11:59:58 (hour:minute:second). Note that a unit of time of the target time, the adjusted target time, and the target time error value can be as precise as a unit of time smaller than a second (e.g., a millisecond). For instance, the target time is 12:00:00:000 (hour:minute:second:millisecond), and the target time error value is 200 milliseconds. The calculated adjusted target time is 11:59:59:800 (hour:minute:second:millisecond).

Next, in step S240, the M pieces of target media content is played according to the respective adjusted target time of the M playback devices through the M playback devices.

For instance, one playback device of the M playback devices (e.g., the playback device 200(1)) is taken as an example herein. In response to that the device time of the playback device 200(1) is equal to the adjusted target time, the processor 210 (or the playback module 222) of the playback device 200(1) identifies the target media content stored in the media content database 223 corresponding to the playback command and begins playing the target media content. That is, when the device time is equal to the adjusted target time, the processor 210 (or the playback module 222) begins playing the target media content. Note that the disclosure focuses on how to enable the multiple playback devices in the synchronous playback system to synchronously play the specified media content. Other details related to how the media content is played are not provided herein.

Note that the time error calculation module 221 and the playback module 222 are implemented in the synchronous playback method provided by the embodiment in a software or firmware form. In this way, the playback devices become electronic devices featuring specific functions (synchronous playback device capable of processing network delay). Nevertheless, the disclosure is not limited thereto. That is, the time error calculation module 221 and the playback module 222 may also be implemented as hardware circuits. For instance, in another embodiment, the time error calculation module 221 may be implemented as a time error calculation circuit unit to execute the function of the time error calculation module 221. The playback module 222 may be implemented as a playback circuit unit to execute the function of the playback module 222. The processor 210 may be coupled to the time error calculation circuit unit and the playback circuit unit to manage operations of the time error calculation circuit unit and the playback circuit unit, and that the overall synchronous playback method is thereby implemented.

In view of the foregoing, in the synchronous playback system and the synchronous playback method provided by the embodiments of the disclosure, multiple playback devices may be used to perform the time-calibrating operation on the time server so as to obtain the target time error values individually corresponding to the plurality of playback devices. The target time corresponding to the playback commands issued by the control server may be adjusted according to the target time error values, so that the playback devices may synchronously play the plurality of target media content instructed by the playback commands according to the adjusted target time. In this way, delays among the plurality of target media content played by the plurality of playback devices may be reduced, and the synchronous playback system may therefore provide a favorable playback effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A synchronous playback system, comprising:
   M playback devices, wherein each of the M playback devices stores one piece or a plurality of media content, wherein M is a positive integer;
   a control server, connected to the M playback devices through network connection; and
   a time server, configured to obtain standard time information through the Network Time Protocol, providing the standard time information to the M playback devices through the Internet,
   wherein each of the M playback devices performs a time-calibrating operation on the time server to obtain a target time error value of each of the M playback devices,
   wherein the control server issues M playback commands to the M playback devices, wherein the M playback commands are configured to instruct the M playback devices to individually play M pieces of target media content stored in the M playback devices at a same target time,
   wherein the M playback devices calculate adjusted target time of each of the M playback devices according to the target time and the target time error value of each of the M playback devices,
   the M playback devices play the M pieces of target media content according to the respective adjusted target time of the M playback devices,
   wherein each of the M playback devices performs the following steps when executing the time-calibrating operation:
   transmitting N time-calibrating packages to the time server to obtain N first time error values corresponding to the N time-calibrating packages;
   sorting the N first time error values according to the values of the N first time error values to obtain a first time error value sequence; and
   selecting P second time error values in the sorted N first time error values according to the first time error value sequence to calculate an average value of the P second time error values to be treated as the target time error value, wherein P is less than N, and N and P are both positive integers.

2. The synchronous playback system as claimed in claim 1, wherein a total number of the first time error values sorted prior to the P second time error values in the first time error value sequence is a, and a total number of the first time error values sorted after the P second time error values in the first time error value sequence is b,
   wherein (a+b)=(N−P), and a and b are positive integers.

3. The synchronous playback system as claimed in claim 1, wherein the first time error value corresponding to one of the N time-calibrating packages transmitted by one playback device is calculated according to the following formula:

$$\theta = \frac{(t_1 - t_0) + (t_2 - t_3)}{2}$$

wherein θ is the calculated first time error value, t0 is time of transmitting the time-calibrating package from the playback device, t1 is time of receiving the time-calibrating package by the time server, t2 is time of transmitting a response corresponding to the time-calibrating package by the time server, and t3 is time of receiving the response by the playback device, wherein the response is configured to indicate that the time-calibrating package is received by the time server, and the response comprises the standard time information, wherein the playback device adjusts device time of the playback device to standard time according to the standard time information.

4. The synchronous playback system as claimed in claim 1, wherein
   the adjusted target time of one playback device of the M playback devices is a difference value of the target time minus the target time error value of the playback device,
   wherein the playback device begins to play target media content of the playback device in response to that the device time of the playback device of the M playback devices is equal to the adjusted target time.

5. A synchronous playback method, adapted to enable M playback devices to synchronously play media content stored by each of the playback devices, wherein M is a positive integer, and the synchronous playback method comprises:
   obtaining standard time information through a Network Time Protocol and providing the standard time information to the M playback devices through an Internet through a time server;
   performing a time-calibrating operation on the time server through each of the M playback devices to obtain a target time error value of each of the M playback devices;

issuing M playback commands to the M playback devices through a control server, wherein the M playback commands are configured to instruct the M playback devices to individually play M pieces of target media content individually stored in the M playback devices at a same target time;

calculating adjusted target time of each of the M playback devices according to the target time and the target time error value of each of the M playback devices through the M playback devices; and playing the M pieces of target media content according to the respective adjusted target time of the M playback devices through the M playback devices, wherein the time-calibrating operation comprises the following steps:

transmitting N time-calibrating packages to the time server to obtain N first time error values corresponding to the N time-calibrating packages;

sorting the N first time error values according to the values of the N first time error values to obtain a first time error value sequence; and selecting P second time error values in the sorted N first time error values according to the first time error value sequence to calculate an average value of the P second time error values to be treated as the target time error value, wherein P is less than N, and N and P are both positive integers.

6. The synchronous playback method as claimed in claim 5, wherein a total number of the first time error values sorted prior to the P second time error values in the first time error value sequence is a, and a total number of the first time error values sorted after the P second time error values in the first time error value sequence is b, wherein (a+b)=(N−P), and a and b are positive integers.

7. The synchronous playback method as claimed in claim 5, wherein the first time error value corresponding to one of the N time-calibrating packages transmitted by one playback device is calculated according to the following formula:

$$\theta = \frac{(t_1 - t_0) + (t_2 - t_3)}{2}$$

wherein θ is the calculated first time error value, t0 is time of transmitting the time-calibrating package from the playback device, t1 is time of receiving the time-calibrating package by the time server, t2 is time of transmitting a response corresponding to the time-calibrating package by the time server, and t3 is time of receiving the response by the playback device, wherein the response is configured to indicate that the time-calibrating package is received by the time server, and the response comprises the standard time information, wherein the playback device adjusts device time of the playback device to standard time according to the standard time information.

8. The synchronous playback method as claimed in claim 5, wherein the step of calculating the adjusted target time of each of the M playback devices according to the target time and the target time error value of each of the M playback devices through the M playback devices comprises:

obtaining a difference value by subtracting the target time error value of the playback device from the target time to be treated as the adjusted target time of one playback device of the M playback devices, wherein the step of playing the M pieces of target media content according to the respective adjusted target time of the M playback devices through the M playback devices comprises:

beginning to play target media content of the playback device by the playback device in response to that the device time of the playback device of the M playback devices is equal to the adjusted target time.

* * * * *